US005312793A

United States Patent [19]

Colombo et al.

[11] Patent Number: 5,312,793

[45] Date of Patent: May 17, 1994

[54] STABLE AQUEOUS SUSPENSIONS OF ZEOLITE WHICH CAN BE EASILY PUMPED

[75] Inventors: Paolo Colombo; Pier D. Mattioli, both of Saronno; Luigi Valtorta, Desio; Pierino Radici, Turate, all of Italy

[73] Assignee: Enichem Augusta Industriale S.r.l., Milan, Italy

[21] Appl. No.: 905,731

[22] Filed: Jun. 29, 1992

[30] Foreign Application Priority Data

Jul. 1, 1991 [IT] Italy ........................ MI 91 A 001813

[51] Int. Cl.[5] ........................ B01J 20/18; B01J 20/28; C11D 3/08

[52] U.S. Cl. ........................ 502/62; 252/173; 252/174.15

[58] Field of Search .............. 502/62; 252/173, 174.15

[56] References Cited

U.S. PATENT DOCUMENTS 4,649,036 3/1987 Pastorello et al. .................. 423/328
4,671,887 6/1987 Diehl et al. .................... 252/174.25
4,741,862 5/1988 Kosal .............................. 252/174.15
5,064,562 11/1991 Tost et al. ....................... 252/174.15

FOREIGN PATENT DOCUMENTS 294694A 6/1988 European Pat. Off. .
5734016 2/1982 Japan ..................................... 502/62
5734017 2/1982 Japan ..................................... 502/62

*Primary Examiner*—Carl F. Dees
*Attorney, Agent, or Firm*—Shea & Gould

[57] ABSTRACT

Stable aqueous suspensions of zeolite 4A which can be easily pumped, containing from 0.5 to 65% of zeolite and from 0.05 to 6 g (per 100 g of zeolite) of a suspending agent, composed of mixtures of ethoxylated alkanols, said mixtures being obtained by ethoxylating: a) biodegradable branched alkanols, having from 10 to 18 carbon atoms and having a single branching in position 2, said mixtures containing at least 2 alkanols having a different number of C atoms; or b) mixtures containing 40–100% of branched alkanols as in a) and 60–0% of linear alkanols having from 10 to 18 C atoms.

15 Claims, No Drawings

STABLE AQUEOUS SUSPENSIONS OF ZEOLITE WHICH CAN BE EASILY PUMPED

The present invention relates to stable aqueous suspensions of zeolite 4A having a low viscosity, a sodium aluminiun-silicate, widely used in the field of detergents (see for example German Patent 3.002.278). The above zeolite is often produced in the form of an aqueous suspension and it is obviously desirable to produce suspensions (normally containing stabilizers) having at least the following characteristics:

high quantity of solid suspended material, to reduce the negative effects of transport;

high stability, to avoid breakage of the suspension, with the formation of deposits and consequently obstructions;

low viscosity, to facilitate pumpage of the suspension, in the stocking and transfer phase; high biodegradability of the stabilizers.

German Patent publication DE-OS-3444311 discloses the use, as a suspending agent, of the ethoxylation product of an alkanol having a single number of carbon atoms (13), preferring the use of an ethoxylation product of isotridecylic alcohol which, as is known, derives from the oxosynthesis of a propylene tetramer (see Ullmann's: Encylcopedia of Industrial Chemistry; Fifth Edition (1985); volume A1; page 293); the Applicant has noticed however, as can be seen in the Examples, that this kind of product is not satisfactory from the point of view of biodegradability and that even in terms of viscosity (and consequently of pumpage) it is possible to prepare products having better characteristics.

European Patent publication EP-A-294.694 represents a step forward, in that it discloses that it is possible to advantageously use, for the production of stable suspensions of zeolite, mixtures containing the ethoxylation product of linear and branched oxo-alcohols (more biodegradable than isotridecylic alcohol), provided that the percentage of branched alkanols is not more than 25% by weight. The Applicant noticed, however, that the viscosity of these mixtures was too high and that the corresponding suspensions, although stable, consequently presented problems during pumpage. The same Applicant has now succeeded in preparing suspensions also based on biodegradable agents, equal or better than those described in EP-A-294694 above, but which differ greatly in their degree of viscosity and consequently pumpage facility.

In its widest aspect the invention relates to stable aqueous suspensions of zeolite 4A which can be easily pumped, insoluble in water, containing from 0.5 to 65% by weight of anhydrous zeolite, and from 0.05 to 6 g, per 100 g of anhydrous zeolite, of a suspending agent, composed of mixtures of ethoxylated alkanols, having an average ethoxylation degree of 3 to 12, wherein said alkanol mixtures are obtained by ethoxylating:

a) mixtures of biodegradable branched alkanols, having from 10 to 18 carbon atoms and having a single branching in position 2, said mixtures containing at least 2 alkanols having a different number of carbon atoms; or:

b) mixtures containing from 40 to 100% by weight (preferably from 90 to 100%) of branched alkanols as in a) and from 60 to 0% by weight (preferably from 10 to 0%) of linear alkanols having from 10 to 18 carbon atoms.

Good results have been obtained with binary mixtures and mixtures of a wider range (for example binary mixtures $C_{10}$–$C_{11}$, $C_{12}$–$C_{13}$ or $C_{14}$–$C_{15}$; $C_{12}$–$C_{13}$–$C_{14}$–$C_{15}$ mixtures; $C_{15}$–$C_{16}$–$C_{17}$–$C_{18}$ mixtures etc.); very good results have been obtained with binary mixtures of biodegradable branched alkanols having from 12 to 13 carbon atoms, having a single branching in position 2, the ratio between the alkanols having 13 carbon atoms and those having 12 carbon atoms being from 70:30 to 30:70 by weight.

The quantity of anhydrous zeolite, in the suspension, is preferably from 45 to 60% by weight and the quantity of suspending agent is preferably from 0.50 to 5.00 g per 100 g of anhydrous zeolite. The preferred average ethoxylation degree (EO) is from 3 to 12; it should be particularly pointed out that very positive results have been obtained by operating with mixture of three ethoxylated products, the first having an EO value = 4.4±0.5, the second an EO value = 6.0±0.5 and the third an EO value = 9.3±0.5. The weight ratio first product:second product:third product is preferably from 1:2:1 to 2:1:2. Good results can also be obtained with binary mixtures (A+B) first product/second product, first product/third product or second product/third product, the weight ratio A:B being from 1:3 to 3:1.

The ethoxylated alcohols defined above are the essential components of the suspensions of the present invention, although they may also contain other components, for example, anti-foaming additives or solubility promoters, i.e. compounds which improve the solubility of the suspending agent in the aqueous phase. Normal additives may be used as anti-foaming agents, such as anti-foaming soaps or foam-suppressing silicons. An addition of this kind is not strictly necessary; however it may be required when the suspending agent is a strong foam-producer. The following may be used as solubility promoters: benzene-sulphonic acid, paratoluenesulphonic acid, xylene-sulphonic acid, their alkaline salts, n-octyl sulphate, their mixtures, etc. Complexing agents of the calcium ion and magnesium ion may also be added, such as acrylic-maleic copolymers and MA-VA copolymers (anhydrous maleic-vinylacetate copolymers), described for example in European Patent publications 391711, 404377 and 425068, filed by the Applicant.

Small quantities of rubber may also be added (for example, 0.01–0.20% by weight, with respect to the anydrous zeolite), selected for example from xantane rubber, guar rubber, ramsan rubber, their mixtures etc., described in Italian Patent 1.173.485 and in Japanese Patent publication 1989/225 699-A.

Finally, it is also possible to add the copolymers of methacrylic acid with ethyl acrylate, partially cross-linked, described for example in Italian Patent Application 22728 A/89, in quantities of 0.1 to 1% by weight, with respect to the anhydrous zeolite. The suspensions of the present invention may be easily prepared by the simple mixing of the components; the zeolite in particular may be added in its dry or humid state, or as a dispersion in water (preferably as a humid filter cake, optionally together with additional quantities of water). As an alternative, the preparation may be carried out in a mill, as described for example in European Patent 354473.

The preferred suspensions of the present invention contain zeolite 4A in quantities equal to or higher than 50% by weight and have the following characteristics:

a viscosity (at 50° C.) equal to or less than 250, preferably 210 and even better 170 mPa.s, a viscosity (at 20°

C.) equal to or less than 300, preferably 240 and even better 200 mPa.s.

resistancy to sedimentation equal to or higher than 97% after 12 days;

type 1 behaviour class after 12 days;

biodegradation percentage of the suspending agent (BIAS) equal to or higher than 90%;

biodegradation induction time of the suspending agent equal to or less than 6 days.

The suspensions of the present invention are extremely stable and can be easily pumped, even after long interruptions of the pumping system, at temperatures ranging from room temperature to 50° C.; these suspensions can consequently be used with a great deal of satisfaction in the preparation of liquid detergents or granulated or powder detergents, for example in spray-drying plants. The following examples provide a better illustration of the present invention but do not limit it in any way; in all the examples the suspensions are evaluated in accordance with the following criteria:

A) % OF SUSPENSION (RESISTANCE TO SEDIMENTATION)

A graduate cylinder of polyethylene, having a volume of 500 $cm^3$ and a diameter of 3 cm, is completely filled with the suspension to be evaluated (filling level=100%) and is left to rest at 50° C. for about 20 hours and then at room temperature for a variable stocking period. At the end, the level of the area of limpid liquid, above the suspension, is measured, and the behaviour of the suspension (resistance to sedimentation) is expressed as a "suspension %"; for example, "100% of suspension" means that no limpid liquid phase has been formed.

B) BEHAVIOUR CLASS

The consistency of the possible sediment, at the end of the storage, is determined by emptying the container. The following evaluations (behaviour classes) were given on the basis of the behaviour of the suspension and sediment:

Class 1: the container empties completely in 2 minutes, without any trace of sediment;

Class 2: the container empties completely after 5 minutes, with a fine veil of sediment;

Class 3: the container empties, but a sediment remains, having a hard consistency and which is difficult to remix.

C) VISCOSITY

The viscosity of the suspensions containing the suspending agent was determined, at 20° C. and at 50° C., by means of a Brookfield viscometer rotating at 20 revs/minute (spindle 2).

D) BIODEGRADABILITY

The primary biodegradability of the suspending agents (biodegradation % BIAS) and the biodegradation induction time determined according to the following method: OECD-Screening test NL 251 19/09/1984 BIAS.

EXAMPLE 1

A humid filter cake of zeolite 4A, obtained by means of the process described in French Patent 2.447.349, had the following characteristics:

formula of the zeolite: $Na_2O.Al_2O_3.2SiO_2.4.5H_2O$;

crystallinity of the zeolite: 98% (determined by X ray analysis);

exchange power with calcium: 170 mg of CaO per g of anhydrous zeolite (determined according to the method described in the above French Patent);

particle-size analysis of the zeolite (determined with a Coulter Counter apparatus):

| Particle size (microns) | Quantity (% by weight) |
|---|---|
| bigger than 15 | 1 |
| 15–10 | 2 |
| 10–8 | 3 |
| 8–6 | 5 |
| 6–4 | 32 |
| 4–2 | 85 |
| smaller than 2 | 15 |

15 g of a suspending agent (suspending agent 1), previously obtained by ethoxylating (at different ethoxylation degrees) a mixture of biodegradable branched alkanols, sold under the trade-name of ISALCHEM 123 and having the following characteristics, were added to 985 g of cake, containing 500 g of anhydrous zeolite 4A.

| | |
|---|---|
| Color (APHA) | 5 |
| Density (at 20° C.) | 0,835 |
| Flow point (°C.) | −45 |
| Flash point (°C.) | 137 |
| Initial Boiling Point (°C.) | 257 |
| Final Boiling Point (°C.) | 287 |
| Average molecular weight ($M_w$) | 194 |
| Hydroxy number (mg KOH/g) | 289 |
| Acidity number (mg KOH/g) | 0,05 |
| Saponification number (mg KOH/g) | 0,01 |
| Carbonyl number (mg KOH/g) | 0,1 |
| Bromine value (mg $Br_2$/100 g) | 30 |
| Water (% by weight) | 0,07 |
| Hydrocarbons (% by weight) | 0,1 |
| Straight chains (% by weight) | 5 |
| MOLECULAR DISTRIBUTION (% by weight) | |
| Alcohols lower than C12 | 0,5 |
| Alcohol C12 | 42 |
| Alcohol C13 | 56 |
| Alcohols higher than C13 | 1,5 |
| ISOMERS DISTRIBUTION (% by weight) | |
| C12 isomers (total = 100%) | |
| 1-Heptanol, 2-Pentyl + 1-Octanol, 2-Butyl | 31 |
| 1-Nonanol, 2-Propyl | 19 |
| 1-Decanol, 2-Ethyl | 17 |
| 1-Undecanol, 2-Methyl | 33 |
| C13 isomers (total = 100%) | |
| 1-Octanol, 2-Pentyl | 24 |
| 1-Nonanol, 2-Butyl | 18 |
| 1-Decanol, 2-Propyl | 17 |
| 1-Undecanol, 2-Ethyl | 15 |
| 1-Dodecanol, 2-Methyl | 26 |

This ISALCHEM 123 mixture, was obtained by means of the oxo-synthesis (with CO and $H_2$) of a mixture of linear olefins, having from 11 to 12 carbon atoms (with the production of $C_{12}$–$C_{13}$ aldehydes), followed by the hydrogenation of the aldehydes to alcohol and separation of the linear alcohols (by fractionated crystallization in an organic solvent, as described in European Patent 154.363). The final step in the preparation of suspending agent 1 was carried out by mixing:

100 parts by weight of ISALCHEM 123 alcohol ethoxylated (on an average) with 4.4 moles of ethylene oxide;

100 parts by weight of ISALCHEM 123 alcohol ethoxylated (on an average) with 6.0 moles of ethylene oxide;

100 parts by weight of ISALCHEM 123 alcohol ethoxylated (on an average) with 9.3 moles of ethylene oxide.

The characteristics of suspending agent 1 resulting from the mixture of the three products at different ethoxylation degrees, are shown below.

| | |
|---|---|
| Color (Apha) | 10 |
| Flow point (°C.) | 17,5 |
| Cloud Point (10% in di-butyldiglycol) (°C.) | 69 |
| Viscosity (at 50° C.) (mPa · s) | 20 |
| Density (at 50° C.) (g/cm$^3$) | 0,95 |
| Hydroxy number (mg KOH/g) | 11,9 |
| Acidity number (mg KOH/g) | 116,5 |
| Polyethyleneglycol (% by weight) | less than 0,5 |
| Water (% by weight) | less than 3,0 |
| Ashes (% by weight) | less than 0,5 |
| Average molecular weight (Mw) | 481,5 |
| Flash point (°C.) | higher than 190 |

(*)HYDROPHILIC-LIPOPHILIC BALANCE.

EXAMPLE 2 (COMPARATIVE)

Example 1 is repeated substituting suspending agent 1 with suspending agent 2, obtained by ethoxylating (with the same ethoxylation degrees) a mixture of alkanols composed of 25% by weight of the same ISALCHEM 123 alcohols as Example 1 (branched) and 75% by weight of a cut of linear alkanols containing about 42% by weight of n-dodecanol and about 58% by weight of n-tridecanol. The results are shown in Table 1 and are clearly unsatisfactory as regards viscosity.

EXAMPLE 3 (COMPARATIVE)

Example 1 is repeated substituting suspending agent 1 with suspending agent 3, obtained by ethoxylating a mixture of alkanols with a high branching content, mainly composed of tetramethyl-nonylic alcohols and known as "isotridecylic alcohol" (as described by Ullmann's; loc.cit). This mixture of highly branched alkanols (mainly tetra-methyl-nonanols), i.e. containing more than one branching per molecule was obtained by the oxo-synthesis (with CO and $H_2$) of a propylene tetramer, and subsequent hydrogenation of the aldehydes to alcohols. From Table 1, it can be seen that there are no advantages with respect to viscosity and stability compared to the test using suspending agent 1; in addition the problem of the biodegradability remains unsolved.

EXAMPLE 4

The following were added, in this order, to 990 g of humid cake, containing 500 g of anhydrous zeolite 4A:

a) 10 g of SUSPENDING AGENT 1 (as per Example 1);

b) 1.2 g of SUSPENDING AGENT 4, composed of an acid methacrylate/ethyl acrylate copolymer, partially crosslinked, obtained in accordance with the process described in Italian Patent Application 22728 A/88.

EXAMPLE 5

The following were added, in this order, to 990 g of humid cake, containing 500 g of anhydrous zeolite 4A:

a) 10 g of SUSPENDING AGENT 1 (as per Example 1);

b) 0.3 g of a SUSPENDING AGENT 5, composed of an equiponderal mixture of xantane rubber and guar rubber. Data and results are shown in Table 1 below.

TABLE 1

| EXAMPLE | 1 | 2* | 3* | 4 | 5 |
|---|---|---|---|---|---|
| Susp. agent 1* | 3** | — | | 2** | 2** |
| Susp. agent 2* | — | 3** | — | — | — |
| Susp. agent 3* | — | — | 3** | — | — |
| Susp. agent 4* | — | — | — | 0,24** | |
| Susp. agent 5* | — | — | — | — | 0,06** |
| Viscosity (mPas) | | | | | |
| at 50° C. | 210 | 500 | 250 | 180 | 170 |
| at 20° C. | 240 | 550 | 280 | 210 | 200 |
| % of suspension (sedimentation resistance): | | | | | |
| after 2 days | 100 | 100 | 100 | 100 | 100 |
| after 7 days | 99 | 97 | 99 | 99 | 99 |
| after 12 days | 97 | 95 | 97 | 98 | 97 |
| Behavior class: | | | | | |
| after 2 days | 1 | 1 | 1 | 1 | 1 |
| after 7 days | 1 | 2 | 1 | 1 | 1 |
| after 12 days | 1 | 2 | 1 | 1 | 1 |
| Primary biodegradation (% biodegradation BIAS) (***) | about 90 | about 90 | about 70 | about 80 | about 90 |
| Induction time (days) (***) | about 6 | about 6 | about 12 | about 8 | about 6 |

*Comparative.
**As respect to anhydrous zeolite.
***Method OECD screening test NL 251; 19-09-1984 BIAS.

We claim:

1. Stable aqueous suspensions of zeolite 4A which can be easily pumped, containing from 0.5 to 65% by weight of anhydrous zeolite and from 0.05 to 6 g (per 100 g of anhydrous zeolite) of a suspending agent, composed of mixtures of ethoxylated alkanols, having an average ethoxylation degree of 3 to 12, wherein said mixtures are obtained by ethoxylating:

a) mixtures of biodegradable branched alkanols, having from 10 to 18 carbon atoms and having a single branching in position 2, said mixtures containing at least 2 alkanols having a different number of carbon atoms; or b) mixtures containing from 40 to 100% by weight of branched alkanols as in a) and from 60 to 0% by weight of linear alkanols having from 10 to 18 carbon atoms.

2. Suspensions according to claim 1, wherein the mixtures of type b) contain from 90 to 100% by weight of mixtures of type a) and from 10 to 0% by weight of said linear alkanols.

3. Suspensions according to claim 1, containing from 45 to 60% by weight of anhydrous zeolite and from 0.5 to 5 g of suspending agent per 100 g of anhydrous zeolite.

4. Suspensions according to claim 1 wherein the mixtures of branched alkanols of type a) are binary $C_{12}$–$C_{13}$ mixtures, the ratio between the alkanols having 13 carbon atoms and those having 12 carbon atoms being from 70:30 to 30:70 by weight.

5. Suspensions according to claim 4, wherein the suspending agent is composed of a mixture of three ethoxylated products having the following average ethoxylation degree:

| | |
|---|---|
| first product: | 4.4 EO ± 0.5 EO; |
| second product: | 6.0 EO ± 0.5 EO; |

-continued

| | |
|---|---|
| third product: | 9.3 EO ± 0.5 EO. |

6. Suspensions according to claim 5, wherein the weight ratio first product:second product:third product is from 1:2:1 to 2:1:2.

7. Suspensions according to claim 4, wherein the suspending agent is composed of a binary mixture of two ethoxylated products (different from each other) A and B, selected from the first, second and third product referred to in claim 5, the ratio A:B being from 1:3 to 3:1 by weight.

8. Suspensions according to claim 1, also containing a rubber.

9. Suspensions according to claim 8, wherein the quantity of rubber, with respect to the anhydrous zeolite, is from 0.01 to 0.20% by weight and the rubber is selected from the group consisting of xantane rubber, guar rubber, ramsan rubber, and their mixtures.

10. Suspensions according to claim 1, also containing a copolymer of methacrylic acid with ethyl acrylate, partially cross-linked.

11. Suspensions according to claim 10, wherein the quantity of copolymer is from 0.10 to 1% by weight, with respect to the anhydrous zeolite.

12. Suspensions according to claim 2, obtained by putting the suspending agent in contact with the zeolite in the form of humid filter cake and optionally adjusting the concentration level of the suspended solid, by adding water, or in a mill.

13. Stable suspensions according to claim 1, containing zeolite 4A in a quantity equal to or higher than 50% by weight and having a viscosity equal to or lower than 250 mPa.s and a viscosity equal to or less than 300 mPa.s.

14. Stable suspensions according to claim 13, wherein the viscosity at 50° C. is equal to or lower than 210 mPa.s and the viscosity at 20° C. is equal to or less than 240 mPa.s.

15. Stable suspensions according to claim 13, wherein the viscosity at 50° C. is equal to or lower than 170 mPa.s and the viscosity at 20° C. is equal to or less than 200 mPa.s.

* * * * *